(No Model.)

F. O. SLANKER.
WAGON AXLE NUT.

No. 340,736. Patented Apr. 27, 1886.

WITNESSES:
J. D. Garfield
C. Sedgwick

INVENTOR:
F. O. Slanker
BY Munn & Co
ATTORNEYS.

United States Patent Office.

FRANK OSCAR SLANKER, OF POMONA, CALIFORNIA.

WAGON-AXLE NUT.

SPECIFICATION forming part of Letters Patent No. 340,736, dated April 27, 1886.

Application filed November 11, 1885. Serial No. 182,458. (No model.)

*To all whom it may concern:*

Be it known that I, FRANK OSCAR SLANKER, of Pomona, in the county of Los Angeles and State of California, have invented a new and Improved Lock for Axle-Nuts, of which the following is a full, clear, and exact description.

My invention relates to locks for nuts which hold vehicle-wheels on their axles, and has for its object to provide a simple, inexpensive, and effective device of this character, which may be applied to new or old vehicles.

The invention consists, mainly, in a gravitating dog eccentrically pivoted to the axle-arm, so as to engage the interior of the wheel-retaining nut, and whereby the unscrewing and loss of the nut will be prevented; and the invention comprises, also, various novel features of construction of the nut-lock dog, the nut, and the axle-arm, all as hereinafter fully set forth.

Reference is to be had to the accompanying drawings, forming part of this specification, in which similar letters of reference indicate corresponding parts in all the figures.

Figure 1:
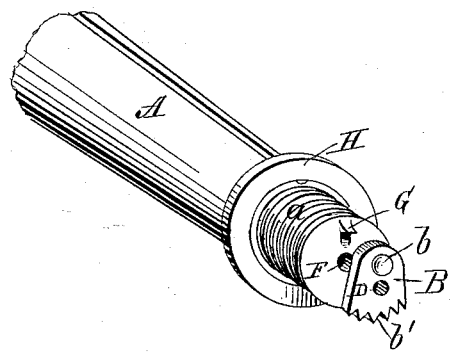
Figure 2:
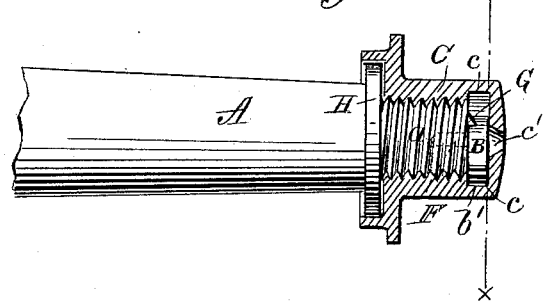
Figure 3:
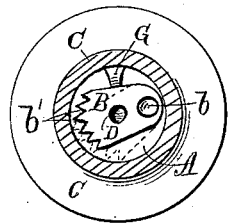
Figure 4:
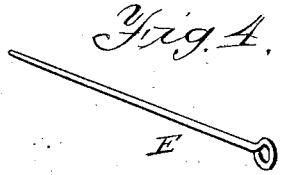

Figure 1 is a perspective view of the end of an axle made in accordance with my invention, and with the nut removed. Fig. 2 is a side elevation of the end of the axle, with the nut applied and in section. Fig. 3 is an end view with the nut in cross-section on the line $x\,x$, Fig. 2, and Fig. 4 is a perspective view of a wire or pin adapted for use in removing the nut from the axle.

To the end of the outer circumferentially-threaded part, $a$, of the axle-arm A is pivoted eccentrically at $b$ a dog, B, the outer or freely-swinging edge of which is roughened, serrated, or toothed, as at $b'$, and the dog is pivoted so that it hangs with the serrated edge downward when the nut C, which retains the wheel (not shown) on the axle-arm, is removed, and as indicated in Fig. 1. The dog B is perforated at D to allow a pin, E, (shown in Fig. 4,) to be passed through the hole D into a hole, F, bored in the end of the axle-arm, when the dog is swung up by the pin into contact with a stop, G, projecting from the end of the axle-arm. I show this stop G as made by upsetting a part of the end of the arm A with a cold-chisel; but the stop may be a pin set into the end of the arm, if preferred.

At the outer part of the nut C, and beyond its internal threads, which screw onto the end $a$ of the axle-arm, is formed an internal annular groove, $c$, which, when the nut is screwed home on the axle-arm and against a shoulder next the leather washer H on the arm, stands in line with the dog B, so that the serrated edge of the dog falls into the groove $c$.

As thus far described the lock is complete for an open-ended nut; but when a capped nut, as shown, is used, the outer end of the nut will be perforated, as at $c'$, to allow the pin E to be passed into the holes D F in the dog and axle-arm.

It is evident that when the nut C is screwed home on the axle and the dog B enters the nut-groove $c$, as above described, the dog will prevent the nut from turning back or off, as the inner face or side of the dog next its serrations $b'$ stands in front or outside of the inner or back wall or side of the slot $c$, as shown in Fig. 2; and to remove the nut the pin E will be passed into the hole D of the dog, and the dog will be swung out of the groove $c$ thereby, and the pin will be passed into the hole F in the axle-arm, which will hold the dog in the position shown in Fig. 3, or clear of the nut C, which then may be turned back off the axle. Should the nut, by jar or accident, become partly unscrewed, the dog B will prevent its detachment by binding upon the interior threads of the nut.

In screwing the nut onto the axle the pin E need not be used, as the dog may be swung to one side by the nut until the threads of the nut engage those of the axle-arm.

The hole F in the end of the axle-arm is not essential to the successful use of the nut-lock, as the dog B may be swung up by the pin E, and be so held by one hand while the other hand is used to turn the nut off; but by providing the hole F for the entrance of the pin the dog may be raised and locked in inoperative position, and the nut may then be unscrewed, and all by using one hand only, which at times may be advantageous.

A match or sliver of wood may be used to turn and hold the dog B out of action instead of the metal pin E.

The groove $c$ of a capped nut need not be specially cut therein to accommodate the dog B, as such a groove, or a shoulder outside of which the dog may drop, is a common formation at the base of the interior thread of the nut.

It is obvious that the herein-described improvement may be applied to all kinds of light or heavy vehicles, to prevent the loss of the axle-nuts by the backing of the vehicle, and the application of the dog to the axle does not weaken the axle or the wheel-retaining nut.

Having thus described my invention, what I claim as new, and desire to secure by Letters Patent, is—

1. A lock for axle-nuts, comprising a gravitating dog eccentrically pivoted to the axle-arm, so as to engage the interior of the nut screwed onto the axle, substantially as herein set forth.

2. A lock for axle-nuts, comprising a gravitating dog eccentrically pivoted to the axle-arm, and the nut provided with an annular groove, as at c, into which the dog swings when the nut is screwed onto the axle-arm, substantially as herein set forth.

3. In a lock for axle-nuts, the combination, with a gravitating dog eccentrically pivoted to the axle-arm and adapted to engage the interior of the nut, of a stop, G, on the axle-arm, substantially as herein set forth.

4. A lock for axle-nuts, comprising a gravitating dog, B, eccentrically pivoted to the axle-arm and adapted to engage the interior of the nut screwed onto the axle, and said dog having a hole, D, to receive a pin, substantially as and for the purpose herein set forth.

5. In a lock for axle-nuts, the gravitating dog B, eccentrically pivoted to the axle-arm and adapted to engage the interior of the nut and provided with a hole, D, and said axle-arm having a hole, F, substantially as and for the purpose herein specified.

6. In a lock for axle-nuts, the combination, with the threaded end a of the axle-arm, of a capped nut, C, provided with an end aperture, c', and the gravitating dog B, pivoted eccentrically to the end of the axle-arm and adapted to engage the interior of the nut, and to be disengaged therefrom by a pin passed through the aperture c', substantially as herein set forth.

FRANK OSCAR SLANKER.

Witnesses:
JAMES HARVEY,
LEN CLAIBORNE.